United States Patent

[11] 3,602,713

| [72] | Inventors | Jacob Kastner<br>Downers Grove, Ill.;<br>Billie G. Oltman, Worth, Ill.; Yehuda Feige,<br>Rehovot, Israel |
|---|---|---|
| [21] | Appl. No. | 53,057 |
| [22] | Filed | July 8, 1970 |
| [45] | Patented | Aug. 31, 1971 |
| [73] | Assignee | The United States of America as represented by the United States Atomic Energy Commission |

[54] PASSIVE MOISTURE METER
6 Claims, 2 Drawing Figs.

[52] U.S. Cl. ............................................................ 250/83.1, 250/83 C
[51] Int. Cl. ............................................................ G01t 3/00, G01n 23/00

[50] Field of Search ........................................... 250/83, 83.1

[56] References Cited
UNITED STATES PATENTS

| 3,009,062 | 11/1961 | Brooksbank, Jr. et al. | 250/83.1 |
| 3,350,561 | 10/1967 | Dresia et al. | 250/83.1 |
| 3,492,479 | 1/1970 | Lowery et al. | 250/83.1 |

Primary Examiner—Archie R. Borchelt
Attorney—Roland A. Anderson

ABSTRACT: A passive moisture meter measures the number of thermal neutrons present in a material as a result of natural radiation, such as cosmic rays, to determine the moisture content of the material. The thermal neutron flux in a control region of known moisture content is also measured to determine the magnitude of the high-energy neutron flux developed by the natural radiation.

Inventors
Jacob Kastner
Billie G. Ottman
Yehuda Feige

Attorney

PASSIVE MOISTURE METER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

It is known that when a material containing hydrogen atoms is bombarded by high-energy neutrons, collisions between the hydrogen atoms and neutrons take place. As a result of these collisions between the hydrogen atoms and the neutrons, the neutrons are slowed down to the point where their energy is about the same as that of the molecules of the surrounding material and they become thermal neutrons. To determine the moisture content of a material it is assumed that only the hydrogen atoms of water exert a slowing down action on the fast neutrons. Thus, in a conventional moisture-meausring system, the material being measured is exposed to a source of fast neutrons of known intensity. A THERMAL NEUTRON DETECTOR IS USED TO MEASURE THE NUMBER OF THERMAL NEUTRONS PRODUCED IN THE MATERIAL AND FROM THIS THE MOISTURE CONTENT CAN BE CALCULATED.

Since the present systems require the use of a high-energy neutron source, they present a possible radiation hazard. Thus, their use is confined to measurements of moisture in locations and in materials where the radiation hazard can be properly controlled. Where it is desired to measure moisture in other materials, such as soil, samples must be collected and brought to a laboratory. Since moisture content is a transient condition, it is difficult to obtain accurate measurements in this manner.

It is therefore an object of this invention to provide a moisture-measuring device which does not use an active neutron source.

Another object of this invention is to provide a moisture-measuring device which can provide continuous moisture measurements at a remote location.

SUMMARY OF THE INVENTION

In practicing the invention for the measurement of soil moisture, a first thermal neutron detector is implanted in the soil at a desired depth. The depth is chosen so that only thermal neutrons generated by the moisture in the soil will be measured. A control region containing a known amount of moisture and a second thermal neutron detector is implanted in the soil at substantially the same depth as the first thermal neutron detector. The first and second thermal neutron detectors and the control region are positioned so that they receive the same fast neutron flux. The first and second thermal neutron detectros are each coupled to a measuring device which includes counters. Each thermal neutron detected by the first and second detectors is counted. By comparing the difference in counts between the detector in the control region and that in the soil under test, the moisture content of the soil can be determined.

DETAILED DESCRIPTION OF THE INVENTION

A high-energy neutron passing through a region containing moisture (hydrogen atoms) will be slowed by the hydrogen atoms to become a thermal neutron. This principle has been used to measure the moisture content of materials by exposing the materials to a known high-energy flux and detecting the number of thermal neutron present. The moisture content of the material tested is a function of the number of thermal neutrons counted and the high-energy neutron flux and can be calculated in a known manner.

Figure 1:
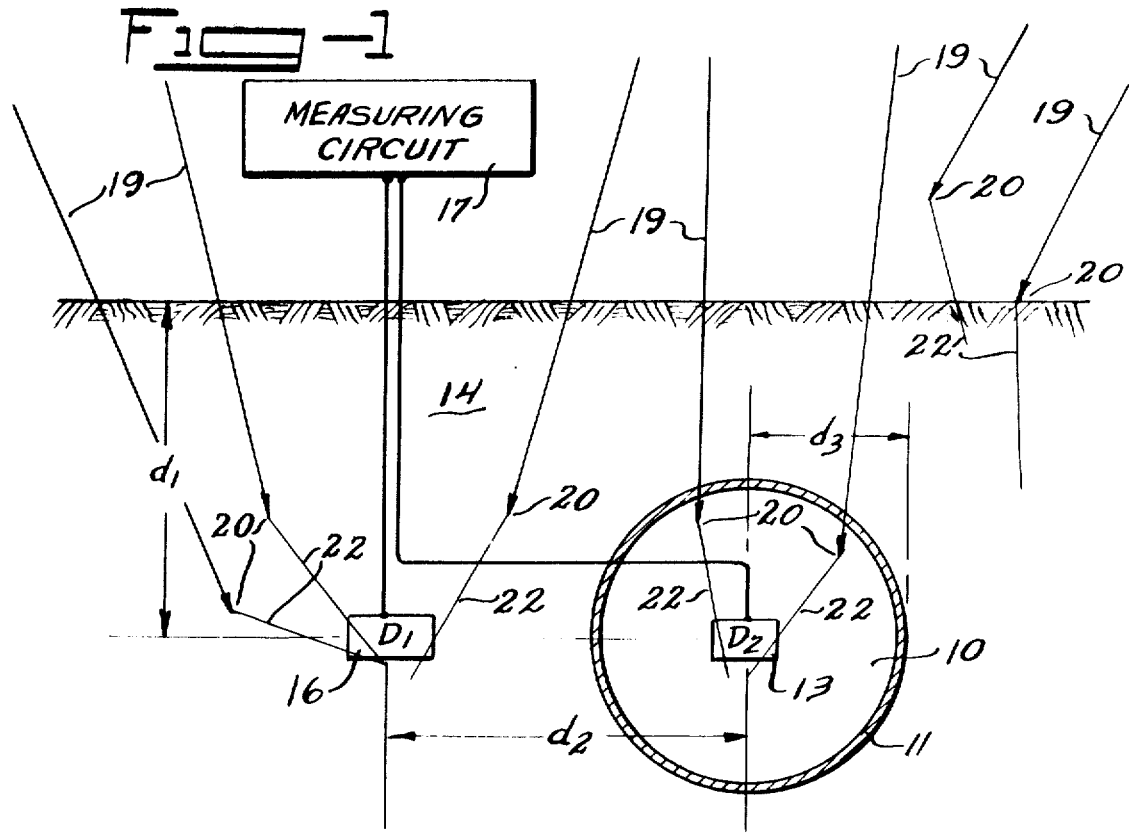
FIG. 1 is a drawing showing the operation of the moisture-measuring system of the invention.

Referring to FIG. 1, there is shown a view of the apparatus of this invention. A region of known moisture content 10 is enclosed within a sphere 11. Sphere 11 can be made of any material which is impervious to moisture and relatively transparent to cosmic rays. Examples of materials which can be used to form sphere 11 are aluminum and cadmium. Sphere 11 is placed in soil 14 and acts to maintain the moisture content of the control region 10 at a constant level. Soil 14 is the material the moisture content of which is to be measured.

Control region 10 contains a thermal neutron detector 13 for measuring the thermal neutrons in the control region 10. A second thermal neutron detector 16 is placed in the soil 14 near the sphere 11 to measure the thermal neutrons in the soil. Both thermal neutron detectors 13 and 16 are coupled to a measuring circuit 17. While the control region is shown as being enclosed in a sphere the invention is not limited to an enclosure of this shape.

In using this system the soil to be tested for moisture content is in the open and thus is subject to a natural cosmic radiation bombardment. The cosmic rays are shown as lines 19 in FIG. 1. At points 20 the cosmic rays interact with particles to develop high-energy neutrons indicated by lines 22. In passing through the soil 14 (or the control region 10) the high-energy neutrons 22 are slowed to become thermal neutrons, primarily by collisions with hydrogen atoms present as a result of moisture. Thermal neutrons striking detectors 13 and 16 are counted and used to determine the amount of moisture in the soil. Detectors 13 and 16 are positioned so that thermal neutrons which strike the detectors are thermalized by the hydrogen atoms in the soil. In FIG. 1, the dimensions $d_1$ and $d_2$ may be of the order of 50 cm. and $d_3$ of the order of 25 cm. The system of FIG. 1 is not limited to these dimensions, however.

Figure 2:
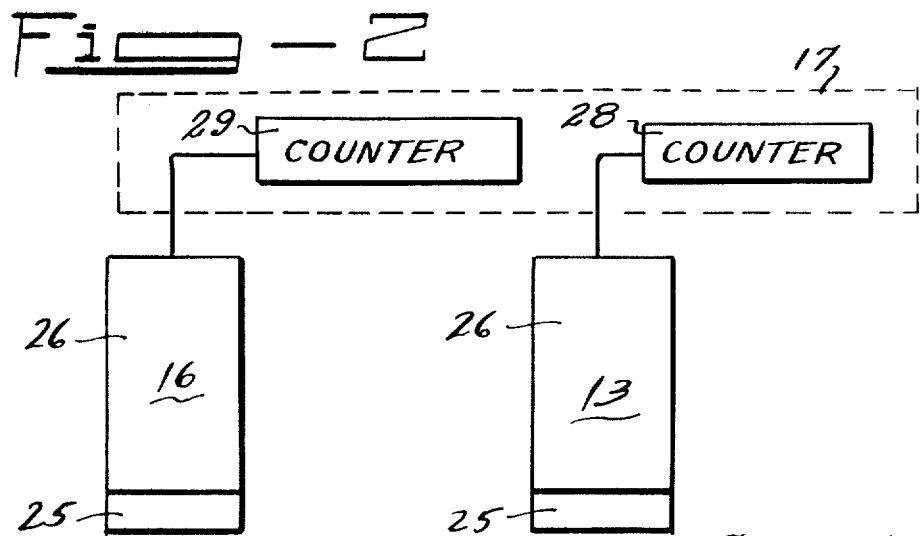
FIG. 2 illustrates the operation of the neutron detector.

Referring to FIG. 2, there is shown a view of the thermal neutron detectors 13 and 16. Each of the detectors consists of a 6Li layer which scintillates when struck by a thermal neutron and a photomultiplier tube 26 which detects the scintillation. Electrical pulses developed by the photomultiplier tubes 26 are coupled to counters 28 and 29 in measuring circuit 17.

The hydrogen atom content of control region 10 is known and thus the number of thermal neutrons detected by detector 13 is a measure of the cosmic ray flux which is being received. With the amount of cosmic ray flux being known (from detector 13) the hydrogen or moisture content of soil 14 is calculated from the number of thermal neutrons detected by detector 16.

The control region 10 can consist of an enclosure filled with sand having a known moisture content, for example. In order to produce a greater thermalizing effect, the control region could also be filled with a material such as paraffin which contains a maximum number of hydrogen atoms to produce the maximum thermalizing effect.

Three parameters are used in making these measurements. they are the high-energy neutron flux, the amount of moderating material (hydrogen atoms) and the thermal neutron flux. If any two of these parameters are known, the third can be found by known methods. In the apparatus of this invention the thermal neutron flux in both the control region and the material to be monitored are measured. The amount of moderating material in the control region is known and thus the high-energy neutron flux can be calculated. Assuming the same high-energy neutron flux in the material being monitored, the measured thermal neutron flux can be used to calculate the amount of moderating material which is present (hydrogen atoms in the form of H2O). A table can be developed to give the moisture as a function of the thermal neutron flux in the material being monitored and the control region. This table can be made by making a series of measurements using material of known moisture content. The amount of moisture can also be calculated using known physical principles (see, for example, The Elements of Nuclear Reactor Theory; Samuel Glasstone and Milton C. Edlund; D. Van Nostrand Co., Inc.; June 1962; pp. 137–190).

Since natural radiation is used to operate the system, a high-energy neutron source with its dangers is not required. The system can be installed at remote locations or in heavily populated areas and left untended with no danger. The system is also not limited to moisture detection but can detect the presence of hydrogen atoms in other materials, such as oil. Thus, it could be used as a detector of oil spills in remote areas which are not regularly patrolled.

The embodiments of the invention in which an exclusive property or privilege is claimed are defined as follows:

1. A system for measuring hydrogen atoms in a material exposed to cosmic ray action including in combination: a first thermal neutron detector positioned in the material at a first desired location, a control region containing a substance of a known hydrogen content positioned in the material at a second desired location, a second thermal neutron detector positioned within said control region, and means coupled to each of said first and second thermal electron detectors for measuring the thermal neutrons.

2. The system of claim 1 wherein, the material is soil exposed to cosmic ray action and said control region contains a substance of a known moisture content.

3. The system of claim 2 wherein, said substance in said control region is sand with a predetermined moisture content.

4. The system of claim 2 wherein, said substance in said control region is paraffin.

5. The system of claim 1 wherein, said control region is contained in an enclosure which prevents changes in the number of hydrogen atoms present.

6. The system of claim 5 wherein, said control region and said enclosure are substantially spherical in shape.